United States Patent
Hottinen et al.

[19]

[11] Patent Number: 5,862,124
[45] Date of Patent: Jan. 19, 1999

[54] METHOD FOR INTERFERENCE CANCELLATION IN A CELLULAR CDMA NETWORK

[75] Inventors: Ari Hottinen, Vantaa; Arto Kiema, Salo; Timo Laakso, Helsinki; Hannu Häkkinen, Espoo; Aimo Tuoriniemi, Kirkkonummi; Ilkka Keskitalo, Oulu; Petri Jolma, Espoo; Ingo Kühn; Jari Savusalo, both of Oulu; Ari Kärkkäinen, Varkaus, all of Finland; Anne Siira, Farnborough, United Kingdom; Risto Uola, Oulu, Finland

[73] Assignee: Nokia Telecommunications OY, Espoo, Finland

[21] Appl. No.: 714,161
[22] PCT Filed: Mar. 20, 1995
[86] PCT No.: PCT/FI95/00146
  § 371 Date: Nov. 22, 1996
  § 102(e) Date: Nov. 22, 1996
[87] PCT Pub. No.: WO95/26593
  PCT Pub. Date: Oct. 5, 1995

[30] Foreign Application Priority Data

Mar. 21, 1994 [FI] Finland .................................... 941310

[51] Int. Cl.⁶ ................. H04J 3/14; H04J 13/02
[52] U.S. Cl. .......................... 370/335; 370/342; 455/67.3; 455/63
[58] Field of Search ...................... 370/320, 331, 370/332, 333, 334, 335, 342, 441, 479, 241, 242, 250, 252; 375/200, 206, 346, 349; 455/423, 422, 424, 425, 436, 437, 438, 439, 440, 441, 442, 443, 444, 67.1, 67.3, 67.6, 63, 432, 501

[56] References Cited

U.S. PATENT DOCUMENTS

| | | |
|---|---|---|
| 5,109,390 | 4/1992 | Gilhousen et al. . |
| 5,175,867 | 12/1992 | Wejke et al. ............................ 455/438 |
| 5,267,261 | 11/1993 | Blakeney, II et al. . |
| 5,343,496 | 8/1994 | Honig et al. ........................... 455/67.3 |
| 5,594,949 | 1/1997 | Anderson et al. ...................... 455/437 |

FOREIGN PATENT DOCUMENTS

| | | |
|---|---|---|
| 566 551 | 10/1993 | European Pat. Off. . |
| 91/07020 | 5/1991 | WIPO . |
| 93/21739 | 10/1993 | WIPO . |

*Primary Examiner*—Huy D. Vu
*Attorney, Agent, or Firm*—Pillsbury Madison & Sutro LLP

[57] ABSTRACT

Interference in a cellular CDMA network due to mobile stations causing multiple use of one carrier frequency in neighboring cells is cancelled. A hard handover is implemented by defining the phase of a spread spectrum code in a signal transmitted from a base station to a mobile followed by measurement of signal strength in the mobile. Thereafter, the result is reported to the CDMA network, inferring whether the mobile interferes with the base station of the neighboring cells. If interference is present, the surrounding base stations are informed about the mobile station channel used, and this information is taken into account in the receivers of signals transmitted by other mobiles within the cell. The measurement results of the mobile are provided as initial values to the parameters required by the initialization of the interference cancellation routines performed in a neighboring base station. In another embodiment, it is decided whether the mobile station has to be monitored at the neighboring base stations by comparing the measurement results with a predetermined threshold value.

10 Claims, 3 Drawing Sheets

METHOD FOR INTERFERENCE CANCELLATION IN A CELLULAR CDMA NETWORK

This application claims benefit of international application PCT/FI95/00146 filed Mar. 20, 1995.

BACKGROUND

The present invention relates to a method for interference cancellation in a cellular CDMA network served by base stations, in which method the interference caused by mobile stations that are in the neighboring cells is accounted for in the base station receivers.

In a cellular CDMA network, in which base stations serving adjacent cells use the same carrier frequency to communicate through mobile stations, interference occurs during handover as mobile stations move from one cell to another until the latter cell has taken over communication with the mobile station. This interference is caused by power adjustment in the communication between the base stations and the mobile stations; power adjustment aims at good reception in each cell regardless of new mobile stations entering the area from neighboring cells. In such a case, for example, before the handover a mobile station approaching a neighboring base station is, as far as the base station is concerned, a source of interference with increasing signal strength, forcing the base station to increase its own transmitting power and/or that of the mobile stations within the cell so that it becomes higher and higher resulting in an increase in the total noise level of the network. In any case, without interference cancellation, the situation leads to repeated overrated transmission power levels, which is most disadvantageous to communication quality and channel use optimization in a CDMA network.

These problems occur especially in using a so-called hard handover technology in which only one base station at a time is communicating with a mobile station. Hard handover represents conventional technology that is relatively easy to implement. The problem in a CDMA network is the interference situations caused by multiple use of one carrier frequency. The interference situations can be controlled by different kinds of interference cancellation routines which measure the interfering signal and generate a cancelling signal which, when combined with the receiver input signal, eliminates the interfering signal from it. This procedure is repeated when necessary to eliminate several interfering signals, c.f. for example WO Application 92/11722 and European Patent Application 491668. The methods developed for the cancellation of interfering signals are largely at a theoretical stage and very complicated. Furthermore, they require that all the base station receivers separately measure all interfering signals in order to determine how to cancel interference from the input signal.

In efforts to reduce interference in handover situations, a so-called soft handover technology has also been employed. This technology allows two base stations to communicate simultaneously with a mobile station currently switching cells and thus eliminates sources of interference even before a mobile station geographically enters the new cell area. As far as the network is concerned, the implementation of the soft handover technology is rather an expensive and complicated operation which requires, among other things, spare channels for performing the handover, and a freely allocatable diversity structure in the mobile station receiver to enable dual connection.

SUMMARY OF THE INVENTION

The object of the present invention is to provide a method for implementing hard handover in a CDMA network. The method of the invention is characterized in that the method comprises the following steps:

- receiving in a mobile station a CDMA signal transmitted by at least one base station of a neighboring cell in the network;
- defining in the mobile station the phase of the spread spectrum code of the signal transmitted by said at least one neighboring base station, and measuring its signal strength;
- transmitting the measurement results of the mobile station to the CDMA network via the base station serving it;
- inferring from the measurement results whether the mobile station interferes with the base stations of the neighboring cells;
- in interference situations, informing the neighboring cell base stations about the mobile station channel; and
- utilizing in each neighboring cell base station the information about the signal transmitted by the interfering mobile station by taking it into account in the receivers of signals transmitted by other mobile stations within the cell;

The method of the invention includes the following advantages:

- the measurement does not require any additional functions or devices in the mobile station, because it is performed in any case, and the signal processing requirements in the network for utilizing the measurement results are low;
- the analysis of the measurement results is concentrated in the base station controller BSC, and the results are thus available to all base stations in the neighboring cells; and
- the measurement results of the mobile station are provided as initial values to the parameters required by the initialization of the interference cancellation routines of the neighboring base station.

BRIEF DESCRIPTION OF THE DRAWINGS

In the following, the invention will be described by means of examples with reference to the accompanying drawings, in which, FIG. 1 schematically shows how a mobile station moves from one cell to another, causing a handover.

DETAILED DESCRIPTION

Figure 1:
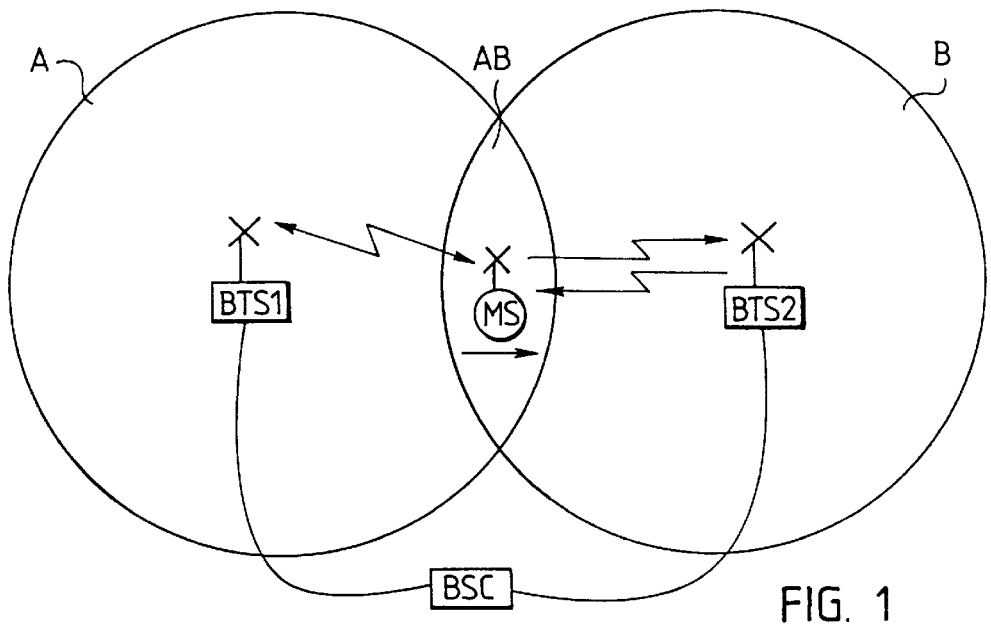

FIG. 1 shows a situation in which a mobile station MS moves, as shown by the arrow, towards the border area AB between cell A (the mother cell) currently serving the mobile station MS and a neighboring cell B, the border area AB being covered by the base stations of both cells, i.e. base station BTS1 and base station BTS2. The mobile station MS constantly measures the signal levels of the base stations of mother cell A and base stations BTS2 in the neighboring cells. Although the figure shows, for reasons of clarity, the base station BTS2 of only one neighboring cell, the term BTS2 will in the following be used of all the neighboring base stations. The measurement results of the mobile station MS are reported through signaling channels of a duplex operation between the MS and BTS1 to the base station controller BSC. The base station controller BSC infers from the measurement results whether the mobile station in question is interfering with the base stations of the neighboring cells, in this simplified case the base station BTS2 in the neighboring cell B. The base station controller BSC informs the neighboring cell base station BTS2 about the approaching mobile station MS.

More precisely and in accordance with the present invention, information of the physical transmitting channel used by the mobile station MS, i.e. the spreading code employed in the uplink direction, is transmitted to the neighboring cell base station BTS2 via mother cell base station BTS1 and the base station controller BSC.

Typically, signal estimation as well as measuring the code phase difference between a mobile station MS and a neighboring cell base station BTS2 are included in the handover preparations of the neighboring cell base stations and the interference cancellation employed in a CDMA network. The receiving channel, i.e. the spreading code of the downlink direction, employed by the mobile station MS is not needed by the neighboring cell base station BTS2 until the actual handover when the communication channel is activated through the new base station BTS2. The interference caused by the mobile station MS can be accounted for either by the interference cancellation routines of the receivers of the neighboring cell base station BTS2 or in the multiple user detection of the receivers. Both options are possible within the scope of the present invention. If measuring receivers are available, they are used to receive the interfering signal from the mobile station. In such a case, each receiver eliminates the interfering signal on the basis of the parameters supplied by the measuring receiver without interference estimation of their own. Another way is to include the interference estimation and cancellation in each receiver separately, in which case each receiver includes the whole interference cancellation routine with measurements. As this invention does not relate to the implementation of interference cancellation on a signal level, the term "interference cancellation routine" will be used in the following to describe all the possible ways of accounting for the interfering signals.

Figure 4:
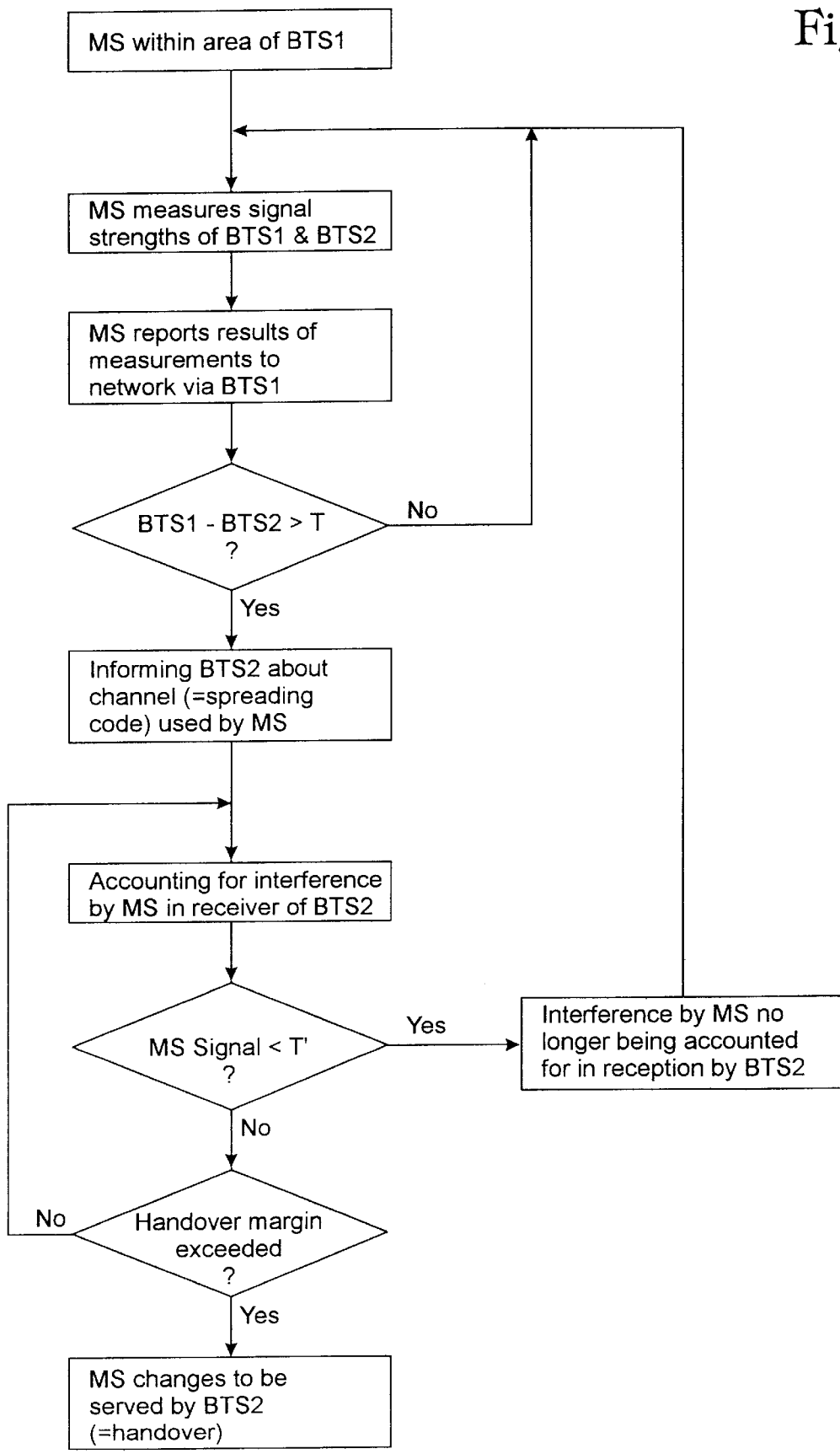
FIG. 4 shows a decision-making process in an embodiment of the method according to the invention.

FIG. 4 shows a flow chart in which a mobile station MS is approaching the service area of the base station BTS2. In the chart, the mobile station MS receives the CDMA signal transmitted by a neighboring cell base station BTS2 of a network, and further, the mobile station MS determines the phase of the spread spectrum code of the signal transmitted by the neighboring cell base station and measures its signal strength. Then, the measurement results of the mobile station MS are forwarded via the base station BTS1 serving it to the CDMA network which infers on the basis of the measurement results whether the mobile station interferes with any neighboring cell base stations BTS2. The inference is based on a comparison between the MS measurement results and a predetermined threshold value T. If interference occurs, those neighboring cell base stations that are interfered with by the mobile station (BTS2 in this example) are informed about the channel the mobile station MS uses. This information is utilized in the neighboring cell base station BTS2 by taking it into account in the receivers of signals transmitted by other mobile stations within the cell.

FIG. 4 also shows a decision-making process concerning a returning threshold value T' corresponding to the threshold value T. The value of T' is naturally lower than that of T in order for stability to be achieved in the decision-making. Towards the end of the chart, an actual handover is also described, i.e. a situation in which the mobile station MS moves to be served by a neighboring base station BTS2.

As the signal code has been decoded on the basis of information forwarded by the base station controller BSC and the measurement results of base station BTS2, the interference can be cancelled in each active receiver of the base station BTS2 from the signals of mobile stations operating within the cell. Thus, the signal levels need not be increased to ensure communication, because the interference can be identified by means of the code, and cancelled. After this, the updatings that are possibly necessary to the parameters of the interference cancelling routine can be calculated by using the measurements of base station BTS2. One way to eliminate interference is to use a separate measuring receivere employing an interference cancelling routine. Another way is to include interference estimation and cancellation separately in each receiver. In the former case, each receiver cancels the interfering signal without interference estimation of its own on the basis of the parametres it has received from the measuring receiver. In the latter case, each receiver includes the whole interference cancellation routine with measurements.

Figure 5:
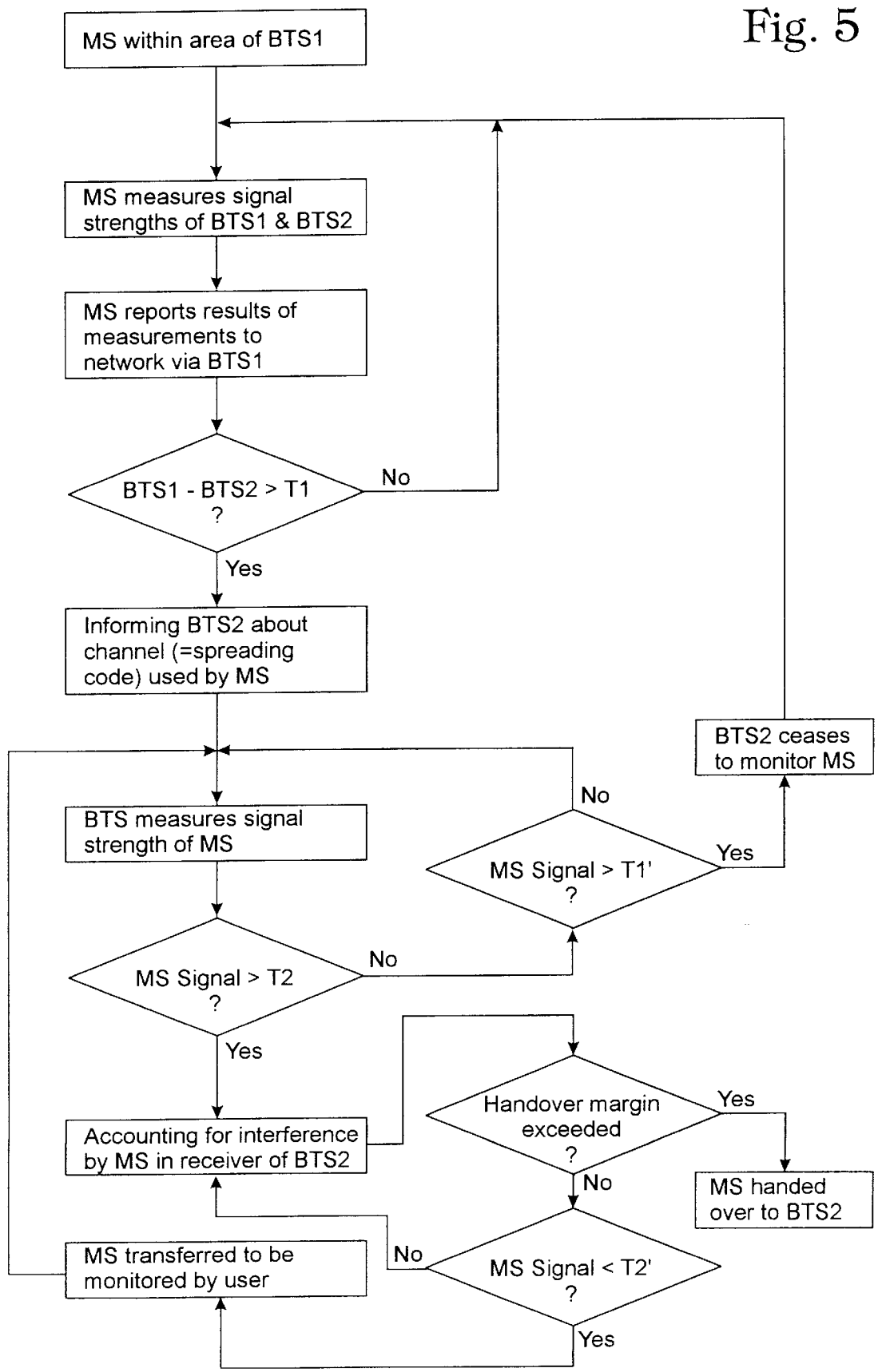
FIG. 5 shows a decision-making process in another embodiment of the method according to the invention.

Another option for eliminating interference in practice is illustrated in the flow chart of FIG. 5. By comparing measurement results to a first predetermined threshold value T1, it shows whether the mobile station MS has to be monitored at the neighboring cell base stations BTS2. Similarly to above, the the mobile station MS to be monitored informs the neighboring cell base stations BTS2 about the channel used by mobile station MS. Following this, the neighboring cell base stations BTS2 . . . BTSn measure the signal strength of the mobile station MS they are monitoring. If the signal strength of the mobile station exceeds a second predetermined threshold value T2 in a neighboring base station BTS2, the signal of the mobile station MS is taken into account in the reception of base station BTS2 so that, as far as the base station BTS2 is concerned, such a signal transmitted by the mobile station that is within the handover marginal HO does not interfere with the reception of signals transmitted by other mobile stations located within the base station BTS2 cell. The chart also shows the decision-making concerning returning threshold values T1' and T2' corresponding to threshold values T1 and T2. Their values are also naturally lower than those of threshold values T1 and T2. Towards the end of the flow chart, an actual handover is also described, i.e. a situation in which the mobile station MS moves to the service area of a neighboring base station BTS2.

In FIG. 5, all users, i.e. mobile stations MS which a certain base station serves or monitors by using threshold values specific to the certain base station, can be divided from the point of view of each base station BTS into three groups, in which case the group to which a user belongs and moving over from one group to another are determined by the interference power measured for the user.

The so-called R-users, i.e. Received Users, are mobile users in the service area of the cell of the certain base station that are in connection with the base station and, further, via the base station to a fixed telephone network.

C-users, i.e. Cancelled Users are those users communicating via a base station of another cell and whose signals in the other base station exceed a predetermined threshold value. The C-users are taken into account in the receivers of the R-users. Bit streams received from the C-users are not forwarded to the network, but are only used for interference cancellation or in multiple user detection methods.

M-users, i.e. Monitored Users, are also monitored with the interference level measurements of the base station itself, for example by regularly measuring the power level of each user and detecting from among them the ones interfering with the respective base station, so that they can be included in the M-user list. Each base station receives, if necessary, information from (in a hexagonal cellular network from six) neighboring base stations on potential interferers and the spreading codes, i.e. channels, they are using.

A C-user becomes an R-user in connection with switching to another base station, i.e. in a (hard) handover. The criterion for this change is based, as will be shown later, on the power measurements made by the base station, or in addition on the so called pilot channel measurements made by the mobile station.

An M-user becomes a C-user and vice versa via a so-called quasisoft handover on the basis of power measurements. The difference between a quasisoft and a soft handover is that in a soft handover the mobile user establishes a connection to two base stations which propagate in the network to a predetermined level at which the signals are combined; in a quasisoft handover no actual connection is established, but one-sided reception is accomplished with a neighboring base station for interference cancellation purposes. Simultaneously, however, the quasisoft handover prepares the neighboring base station for a hard handover which is accomplished by simply connecting the bit stream of the respective user to the network and to the base station controller BSC.

The handover procedure of the invention can also be applied to situations in which mobile stations MS transfer from one base station controller BSC to another. In such a case, the signalling associated with interference cancelling and handover takes place via a Mobile Switching Center, MSC.

Figure 2:
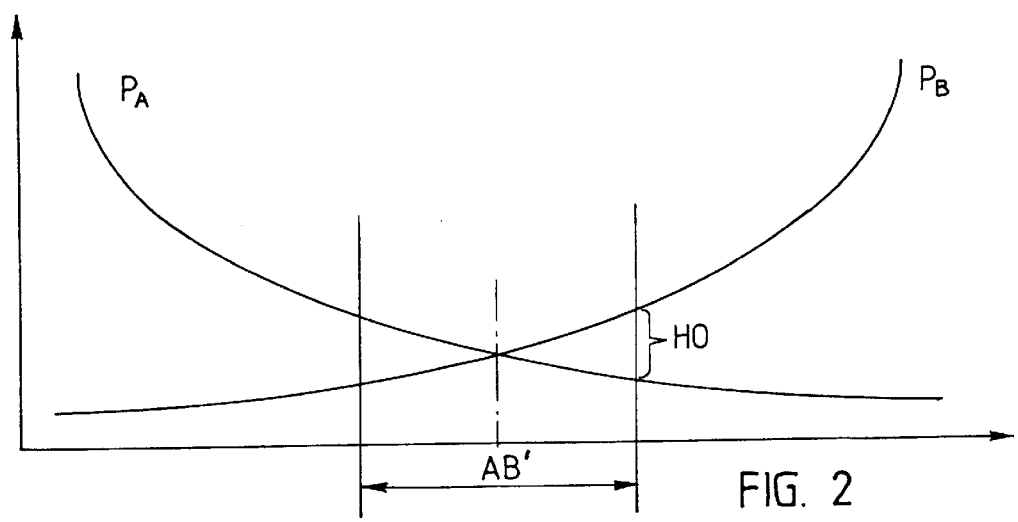
FIG. 2 shows signal levels and their ratio in the case of a hard handover.

FIG. 2 shows an idealized situation corresponding to FIG. 1 from the point of view of signal levels and in proportion to the handover frame.

The signal level $P_A$ of an approaching station is increasing in cell A and, correspondingly, decreasing in cell B. The signal level $P_B$ of a station approaching cell B is, of course, inversely proportional to $P_A$. The border area AB' of the two cells forms an area in which mobile stations communicating with the base station of one cell form sources of inteference to the other cell, as shown earlier. The monitoring of the signal levels of these stations is begun for initiating interference cancellation routines and for implementing a possible handover. The interference cancellation routines can be selectively initiated only in the case of mobile stations whose interference power is increasing (mobile stations approaching the respective base station), which is enough to prevent the power levels from being catastrophically increased between mobile stations and their mother cells as a result of interference.

The decision on handover is made in the area AB' of the so-called handover margin M, as soon as the signal $P_B$ received by the neighboring station is stronger than the mother cell signal $P_A$ to the extent of the handover margin HO. A station moving in the area AB' to the left or right will change mother cells (handover) with a high probability. In such a case, due to the interference cancellation routine, the new mother cell is aware of the parameters required to establish a connection in the same manner as the mobile station is, due to its own measurements, aware of the code phase and signal level of the new mother cell. In such a case the handover procedure is very fast and easily implemented, because the stations are pre-synchronized with respect to each other, compared to a situation in which the base station would only begin synchronization when it is establishing a new connection.

Figure 3:
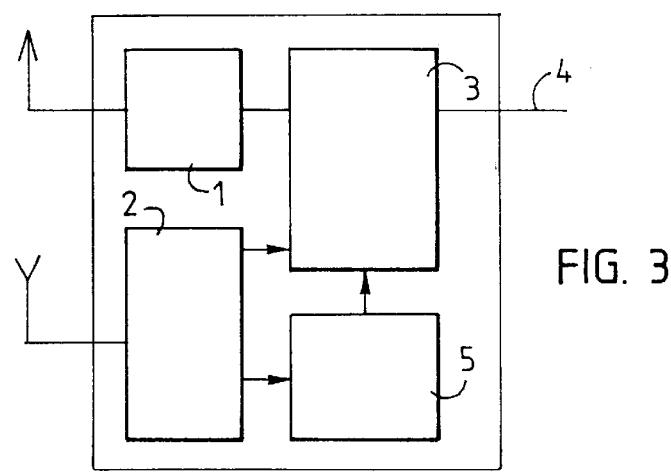
FIG. 3 shows the structure of a base station applying the invention.

FIG. 3 shows a block diagram of an embodiment of a base station in which the method of the invention is applied. Reference number 1 indicates the transmitter unit and number 2 the RF section of the receiver. Block 3 performs, among other things, the baseband processing, channel division by spread spectrum techniques, and interference cancellation. Block 5 represents interference measurement channels and processing of measurement results, which are forwarded as parameters to block 3 for interference cancellation. Optionally, the measurement result processing functions of the block 5 can be included in the interference cancellation routine of block 3, and the separate interference measurement channels in block 5 can be included in channels 2 of the receiver block. Number 4 marks the connection between the base station and the base station controller BSC.

According to one embodiment of the invention, the signals of mobile stations MS to be eliminated by the multiple user interference cancelling routine are restricted to a predetermined maximum number. This would mean that the interfering cancellation routine only cancels, for example, the strongest interfering signals, in which case the complexity of the cancelling routine and the equipment implementing it as well as the number of interference measuring channels can be kept reasonable.

It is obvious for a person skilled in the art that different embodiments of the invention are not restricted to the examples above, but that they may vary within the scope of the attached claims.

We claim:

1. A method for cancelling interference in a cellular CDMA network served by base stations having receivers, in which method the interference caused by mobile stations that are roaming in the neighboring cells is taken into account in the base station receivers, comprising the steps of:

receiving in a mobile station a respective CDMA signal transmitted by at least one base station of a respective neighboring cell in the CDMA network:

determining in said mobile station served by a base station of a cell, the phase of the spread spectrum code of said respective signal transmitted by said at least one neighboring base station, and monitoring the signal strength of said respective signal;

transmitting measurement results from said determining of the mobile station, on a channel used by said mobile station, to the CDMA network, via said base station serving said mobile station;

inferring from said measurement results whether said mobile station interferes with the respective said at least one base stations of the respective neighboring cell;

upon so inferring, informing the respective at least one base station of the respective neighboring cell about said channel used by said mobile station; and utilizing in each of said base stations of said neighboring cells the information about the signal transmitted by said mobile station by taking said information into account in receivers of signals transmitted by respective others of said mobile stations within respective ones of said cells.

2. The method as claimed in claim 1, wherein:

said taking of said information into account includes taking into account interference caused by said mobile station in carrying out an interference cancellation routine of a respective at least one receiver of a respective at least one base station of a respective at least one neighboring cell.

3. The method as claimed in claims 1, wherein:

said taking of said information into account includes taking into account interference caused by said mobile station in multiple user detection of a respective at least one receiver of a respective at least one base station of a respective at least one neighboring cell.

4. A method for cancelling interference in a cellular CDMA network served by base stations serving respective cells, which respectively neighbor one another having receivers, in which method the interference caused by a mobile station roaming in one of said cells is taken into account in the respective base station receivers, comprising the steps of:

receiving in said mobile station a respective CDMA signal transmitted by the respective base station serving each respective neighboring cell;

determining in said mobile station the phase of the spread spectrum code of the respective said signal transmitted by each said respective base station serving a respective neighboring cell and measuring the strength thereof, to obtain measurement results;

transmitting said measurement results, using a channel, to the CDMA network via the base station serving said mobile station;

inferring by comparing the measurement results with a first predetermined threshold value whether said mobile station has to be monitored at the respective said neighboring cell base stations;

upon so inferring that said mobile station has to be monitored, informing the respective base stations of the respective neighboring cells about said channel used by said mobile station for transmitting a signal;

measuring at the respective base stations of the respective neighboring cells, the strength of the signal transmitted by said mobile station being monitored;

if the signal strength of said mobile station as monitored in any base station serving a respective neighboring cell exceeds a second predetermined threshold value, the respective base station serving the respective neighboring call taking into account the signal of said mobile station in reception by the respective base station so that the signal transmitted by said mobile station does not interfere with reception of signals transmitted by other mobile stations located within the respective cell of the respective base station.

5. The method as claimed in claim 1, wherein:

said transmitting of said measurement information comprises transmitting said measurement results from a respective said base station of a cell serving as a mother cell for said mobile station to a base station controller for said cells, and from there to each respective said neighboring cell base station.

6. The method as claimed in claim 5, wherein:

said inferring includes detecting instances of interference in said base station controller.

7. The method as claimed in clam 5, wherein:

said inferring includes detecting situations of interference in a mobile services switching center of said CDMA network.

8. The method as claimed in claim 1, further comprising:

restricting signals of mobile stations, including said signal of said mobile station to be eliminated by use of said method, to a predetermined maximum number.

9. The method as claimed in claim 1, further comprising:

providing each neighboring cell base station the signal of which said mobile station has measured and in which interference has been detected, with parameters for cancelling interference, including information about a difference between a code phase of the signal of the respective base station and a code phase used by said mobile station.

10. The method as claimed in claim 1, further comprising:

measuring at each respective neighboring cell base station in which an interference situation has been detected, the difference between a code phase of the signal of each respective base station and a code phase used by said mobile station, as a parameter for cancelling interference.

\* \* \* \* \*